(12) United States Patent
Rollin et al.

(10) Patent No.: US 8,268,393 B2
(45) Date of Patent: Sep. 18, 2012

(54) METHOD OF FABRICATING A FRICTION PART OUT OF CARBON/CARBON COMPOSITE MATERIAL

(75) Inventors: Magali Rollin, Verberie (FR); René Pailler, Cestas (FR); Michel Cataldi, Villenave d'Ornon (FR); Sandrine Baud, Lyon (FR); Pascale Jacquemard, Saint-Pierre-de-Chandieu (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 576 days.

(21) Appl. No.: 12/503,526

(22) Filed: Jul. 15, 2009

(65) Prior Publication Data

US 2010/0015332 A1 Jan. 21, 2010

(30) Foreign Application Priority Data

Jul. 16, 2008 (FR) ...................... 08 54821

(51) Int. Cl.
*B05D 3/02* (2006.01)
(52) U.S. Cl. ....................................... 427/226
(58) Field of Classification Search ............... 427/226
See application file for complete search history.

(56) References Cited

U.S. PATENT DOCUMENTS

| 4,790,052 A | 12/1988 | Olry |
| 5,792,715 A | 8/1998 | Duval et al. |
| 5,962,135 A * | 10/1999 | Walker et al. ............ 428/408 |
| 6,009,605 A | 1/2000 | Olry et al. |
| 6,363,593 B1 | 4/2002 | Duval et al. |
| 6,376,431 B1 | 4/2002 | Matsumoto et al. |

FOREIGN PATENT DOCUMENTS

| EP | 0 232 059 B1 | 8/1987 |
| EP | 1 748 036 A1 | 1/2007 |
| WO | WO 99/23049 | 5/1999 |
| WO | WO 2006/067184 | 6/2006 |
| WO | WO 2006067184 A1 * | 6/2006 |
| WO | WO 2006/101799 A2 | 9/2006 |

OTHER PUBLICATIONS

H.P. Martin et al.; "Silicon Carbide Derived from Silica Sol and Sugar"; Journal of Materials Science Letters, vol. 14, 1995, pp. 620-622; XP002517969.

* cited by examiner

*Primary Examiner* — Michael Cleveland
*Assistant Examiner* — Robert Vetere
(74) *Attorney, Agent, or Firm* — Pillsbury Winthrop Shaw Pittman, LLP

(57) ABSTRACT

A method of fabricating a friction part out of carbon/carbon composite material, the method including obtaining a three-dimensional fiber preform of carbon fibers impregnated with a solution or a suspension enabling a dispersion of refractory metal oxide particles to be left on the fibers of the preform; applying heat treatment to form a metallic carbide by a carboreduction reaction of the refractory oxide with the carbon of the fibers; continuing the heat treatment until the carbide is transformed into carbon by eliminating of the metal; and then densifying the preform with a carbon matrix by chemical vapor infiltration.

14 Claims, 2 Drawing Sheets

METHOD OF FABRICATING A FRICTION PART OUT OF CARBON/CARBON COMPOSITE MATERIAL

CROSS REFERENCE TO RELATED APPLICATIONS

This application claims priority and benefit under 35 U.S.C. §119 to French Patent Application No. 0854821 filed on Jul. 16, 2008. The content of that application is incorporated herein in its entirety by reference.

FIELD OF THE INVENTION

The invention relates to making friction parts out of carbon/carbon (C/C) composite material, i.e. a material comprising fiber reinforcement made of carbon fibers and a matrix made of carbon.

A field of application for the invention is that of making aviation brake disks out of C/C composite material.

BACKGROUND OF THE INVENTION

In order to improve the wear resistance of friction parts made of C/C composite material, proposals have been made to introduce a refractory ceramic therein, and in particular silicon carbide, SiC.

Thus, according to document WO 99/23049, a fiber preform made of carbon fibers is impregnated with a colloidal solution of a refractory oxide such as silica $SiO_2$, which oxide is transformed into carbide by heat treatment, thereby giving rise to a reaction between the oxide and the carbon of the preform fibers. The preform is then densified with a carbon matrix by chemical vapor infiltration (CVI).

In document U.S. Pat. No. 6,376,431, proposals are made to impregnate the fiber preform with a solution of a ceramic precursor, such as an SiC precursor, and then to perform heat treatment to ceramize the precursor prior to densification with a carbon matrix by CVI.

Document WO 2006/067184 in the name of the Applicant, describes a method comprising impregnating two-dimensional textures or fiber plies made of carbon fibers with a solution or a suspension that makes it possible, after a three-dimensional fiber preform has been made from the two-dimensional textures or plies, to obtain an impregnated fiber preform. The solution or suspension is a sol-gel that is a precursor of a refractory oxide such as $SiO_2$, or a colloidal suspension of an oxide, such as colloidal silica. Heat treatment for converting the oxide into carbide by reacting with the carbon of the fibers is performed prior to densification with a carbon matrix by CVI.

The Applicant has observed that the presence of ceramic particles does indeed enable friction wear to be reduced, however it affects the mechanical properties of the resulting C/C composite material friction part. The method of document WO 2006/067184 seeks to attenuate that effect of the presence of ceramic particles by enabling the distribution of ceramic particles within the part to be controlled, in particular in order to avoid having such particles present in zones that are subjected to high levels of mechanical stress, such as the cores of brake disks that serve to transmit braking torque.

SUMMARY OF THE INVENTION

An aspect of the invention is to provide a method that enables C/C composite material friction parts to be obtained that present reduced friction wear, in particular at high temperatures, while still presenting good mechanical properties throughout the volume of the part.

This aspect is achieved by a method of fabricating a friction part out of carbon/carbon composite material, the method comprising:

obtaining a three-dimensional fiber preform of carbon fibers impregnated with a solution or a suspension enabling a dispersion of refractory metal oxide particles to be left on the fibers of the preform;

applying heat treatment to form a metallic carbide by a carboreduction reaction of the refractory oxide with the carbon of the fibers;

continuing the heat treatment until the carbide is transformed into carbon by eliminating of the metal; and then densifying the preform with a carbon matrix by chemical vapor infiltration.

As described in detail below, the Applicant has discovered, surprisingly, that the method of the invention makes it possible to obtain excellent wear resistance in spite of the carbide being transformed into carbon, while also presenting mechanical properties that are similar to those of C/C composite material friction parts obtained in conventional manner by densifying carbon fiber preforms that have not been previously been impregnated with a solution or a suspension enabling ceramic particles to be distributed within the preform.

The heat treatment is performed under an atmosphere that is inert, or essentially inert, i.e. an atmosphere made up of an inert gas and a small quantity of oxygen, typically with an oxygen concentration of a few parts per million (ppm) to a few hundreds of ppm approximately, e.g. lying in the range 2 ppm to 250 ppm.

The heat treatment is preferably performed at a temperature lying in the range 1450° C. to 2300° C. The total duration of the heat treatment is preferably not less than 2 hours (h) and preferably not more than 40 h.

Furthermore, the heat treatment may be performed under low pressure, e.g. under a primary vacuum.

The impregnation may be performed by a colloidal suspension of oxide particles or by a sol-gel containing at least one oxide precursor.

Preferably, the oxide introduced into the fiber preform by impregnation constitutes 0.01% to 10% by weight of the weight of the fiber preform prior to impregnation, and more preferably 0.1% to 5%.

In an implementation, the following are performed in succession: a step of making the fiber preform; and a step of impregnating the fiber preform with the solution or the suspension.

In another implementation, the following are performed in succession: a step of impregnating a two-dimensional fiber texture with the solution or the suspension; and a step of making the impregnated fiber preform from the impregnated fiber texture.

In yet another implementation, the following are performed in succession: a step of impregnating yarns with the solution or the suspension; a step of making an impregnated two-dimensional fiber texture from the impregnated yarns; and a step of making the impregnated fiber preform from the impregnated fiber texture.

The refractory oxide is preferably $SiO_2$.

BRIEF DESCRIPTION OF THE DRAWINGS

In the detailed description given below, reference is made to the accompanying drawings, in which.

DETAILED DESCRIPTION OF IMPLEMENTATIONS

Figure 1:
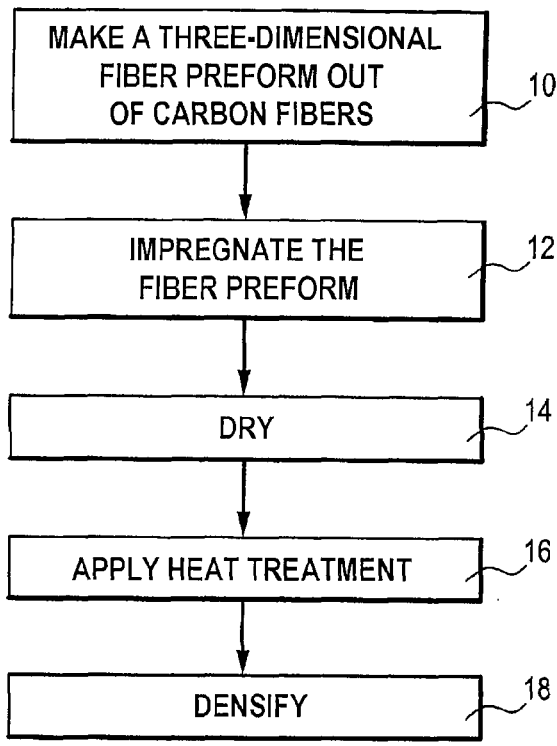
FIGS. 1 and 2 show successive steps in two implementations of a method in accordance with the invention.

A first implementation of a method in accordance with the invention is described with reference to FIG. 1.

A first step 10 consists in making a three-dimensional (3D) fiber preform out of carbon fibers.

In well-known manner, such a 3D preform may be made from plies or layers of a two-dimensional (2D) fiber texture that are superposed and bonded together. The 2D fiber texture may be in the form of a woven fabric, a felt, a knit, or a unidirectional (UD) or multidirectional (nD) sheet. A UD sheet is made up of yarns or filaments extending substantially parallel to one another, and transverse cohesion may be provided, e.g. by light needling, so as to give a certain amount of cohesion to the UD sheet. An nD sheet is made up of superposed UD sheets extending in different directions and bonded to one another, e.g. by needling, stitching, or the like. Complex 2D fiber textures can thus be used comprising a woven fabric or a sheet or a web of free fibers placed on the fabric or the sheet and bonded, e.g. by needling. Bonding between superposed layers or plies of 2D fiber texture may be performed, for example by needling, or by implanting threads, so as to obtain a coherent 3D fiber preform that is coherent, i.e. that can be handled without losing its cohesion. Reference can be made to documents U.S. Pat. No. 4,790,052 and U.S. Pat. No. 5,792,715, which describe the fabrication of 3D fiber plates from which preforms can be cut out, such as annular preforms for brake disks, or to document EP 0 232 059, which describes making an annular preform by superposing annular plies and by circular needling.

The 2D fiber texture may also be in the form of a helical texture that is wound in superposed flat turns so as to form an annular preform such as a brake disk preform. The superposed turns may be bonded together by needling. Reference may be made to documents U.S. Pat. No. 6,009,605 and U.S. Pat. No. 6,363,593.

The 2D fiber texture may be made of carbon, or more usually out of a carbon precursor such as pre-oxidized polyacrylonitrile (PAN), for example. A PAN precursor is transformed into carbon by heat treatment after the 3D fiber preform has been made.

A second step 12 of the method consists in impregnating the fiber preform with a suspension or a solution enabling at least one refractory oxide to be left distributed on the fibers of the preform. It is possible to use a sol-gel solution containing an oxide precursor. For example, a sol-gel containing a precursor for $SiO_2$ may be obtained by mixing tetraethoxysilane (TEOS), $Si(OC_2H_5)_4$, an $SiO_2$ precursor, with ethanol, hydrochloric acid, and water, the particles of $SiO_2$ being obtained after drying. It is also possible to use a colloidal suspension of oxide, the oxide particles having a mean size that is preferably less than 100 nanometers (nm), or even less than 50 nm.

Preferably, use is made of a solution that contains a precursor for $SiO_2$, or of a colloidal suspension of $SiO_2$.

The fiber preform may be impregnated by being immersed in a bath, and impregnation may be assisted by applying a vacuum.

After drying (step 14) refractory oxide particles are distributed on the fibers of the fiber preform, throughout its volume. Impregnation is performed in one or more cycles and by selecting concentrations for the sol-gel solution or for the suspension in such a manner that the quantity of refractory oxide that is distributed in the fiber preform represents 0.1% to 20%, and preferably 1% to 15%, of the weight of the fiber preform prior to impregnation.

Heat treatment is then performed (step 16) to convert the refractory oxide into carbide by a carboreduction reaction with the carbon of the fibers of the preform, and then to transform the carbide into carbon by eliminating the silicon. The heat treatment is performed at a temperature that preferably lies in the range 1450° C. to 2300° C. The total duration of the heat temperature is preferably not less than 2 h and preferably not more than 40 h, it being understood that this duration for achieving complete transformation of the carbide into carbon may depend specifically on temperature. The higher the temperature that is selected, the shorter the duration that can be obtained. Thus, for a heat treatment temperature lying in the range 1450° C. to 1750° C., the duration of the dwell at this temperature may lie in the range 4 h to 40 h, whereas for heat treatment at a temperature lying in the range 1750° C. to 2300° C., the duration of the dwell at that temperature may lie in the range 2 h to 30 h. For example, a temperature of about 1600° may be selected with a duration that is then preferably at least 8 h and at most 36 h.

The heat treatment is performed under an inert atmosphere, e.g. under an inert gas such as nitrogen or argon, or in an atmosphere that is essentially inert, i.e. that may also contain a small quantity of oxygen in addition to an inevitable residual content. In particular, in the lower portion of the above-indicated temperature range, e.g. in the range 1450° C. to 1600° C., the presence of oxygen at a concentration of a few ppm, e.g. a few ppm to a few hundreds of ppm, enhances the transformation of the carbide into carbon.

In addition, likewise for increasing the rate at which carbide is transformed into carbon, it can be advantageous to perform the heat treatment at low pressure, under a dynamic primary vacuum, in particular in the upper portion of the above-indicated temperature range.

The heat treatment may be performed in two stages, a first stage for forming carbide and a second stage for transforming the carbide into carbon, with the two stages possibly being performed under different conditions (temperature, pressure, atmosphere). Thus, the first stage may be performed at a first temperature under an inert gas at atmospheric pressure, and the second stage may be performed under an inert gas at low pressure and at higher temperature.

In a variant, it should be observed that impregnation could be performed on a preform made of carbon-precursor fibers, with the transformation of the precursor into carbon and then the transformation of the oxide into carbide possibly following on one from the other during the same heat treatment.

In another variant, a carbon precursor may be added to the solution or the suspension used for impregnating the fiber preform. During heat treatment, the carbon that results from transforming the precursor reacts with the refractory oxide to form the carbide, thereby making it possible to avoid consuming the carbon of the preform fibers, at least to a large extent. The Applicant has also observed that the particles of carbon then formed are distributed in more uniform manner on the fibers. The precursor may be a polyoside, e.g. saccharose. The quantity of the carbon precursor is selected to provide the carbon required for forming the carbide by reacting the oxide, and without any significant excess of carbon.

After the heat treatment, a step 18 of densification by means of a carbon matrix obtained by CVI is performed so as to obtain a C/C composite material part, possibly with final machining. Forming a carbon matrix by CVI is a process that is itself well known. The preform is placed in an oven into which a carbon-precursor gas is introduced, which gas diffuses within the preform and, by decomposing, provides pyrolytic carbon that is deposited within the preform under determined conditions of temperature and pressure.

Figure 2:
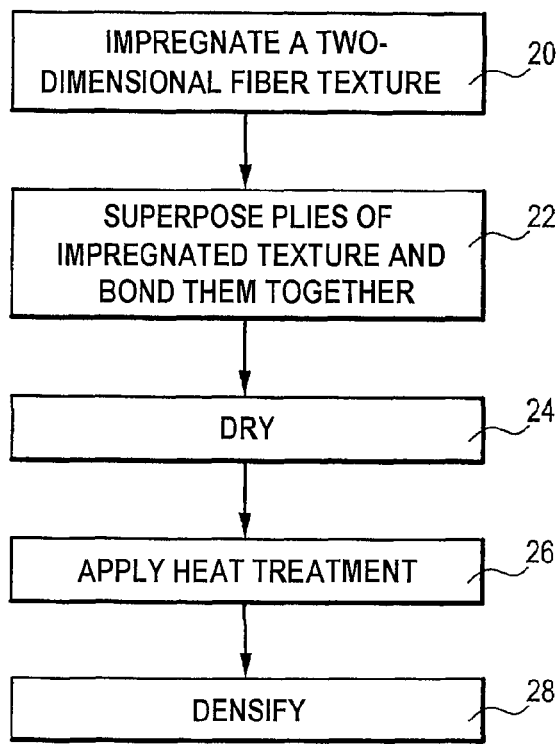

FIG. 2 shows another implementation that differs from that described above in that the impregnation is performed on the 2D fiber texture prior to forming the 3D fiber preform.

Thus, a first step 20 consists in impregnating a 2D fiber texture by immersing it in or passing it through a bath containing a solution or a suspension as described above, or by spraying the solution or suspension.

A 3D fiber preform is made (step 22) by superposing plies of previously-impregnated 2D fiber texture and bonding them together, which bonding may be performed by needling or implanting threads, for example.

Thereafter, steps of needling, heat treatment, and densification (24, 26, and 28) are performed as in the implementation of FIG. 1.

The impregnation may be performed on a 2D fiber texture of carbon precursor fibers, with the transformation of the precursor into carbon then taking place during the heat treatment.

It is also possible to insert plies of non-impregnated 2D fiber texture while making up the 3D fiber preform, as described in above-mentioned document Wo 2006/067184.

It should be observed that it is also possible to envisage impregnating the yarns even before making up the 2D fiber structure with those yarns.

As described below, tests have been performed that show that the method of the invention makes it possible to obtain friction parts made of C/C composite material that present very good wear resistance, in particular at high temperatures, while presenting mechanical properties that are substantially equivalent to those of friction parts obtained in conventional manner by CVI densification of carbon fiber preforms that have not previously been impregnated.

Example 1

Fiber preforms for C/C composite material brake disks were made out of carbon fibers using a method comprising:
making fiber textures in the form of nD sheets of carbon-precursor fibers (pre-oxidized PAN) by superposing UD sheets in three different directions and bonding them together by light needling;
making a 3D fiber plate by superposing nD sheet plies and bonding the plies by needling progressively as they are superposed;
cutting annular carbon-precursor fiber preforms out from the 3D fiber plates; and
applying heat treatment to transform (carbonize) the carbon precursor so as to obtain annular preforms made of carbon fibers.

The preforms made in that way were impregnated with a suspension of colloidal silica at a concentration of 2% by weight. Impregnation was performed by immersion in a bath and applying a vacuum so that after drying there remained particles of $SiO_2$ distributed within the fiber preforms and representing about 3.8% by weight relative to the weight of the fiber preforms prior to impregnation.

The dried preforms were subjected to heat treatment under a stream of nitrogen that was not enriched in oxygen at a flow rate of 4 liters per minute (L/min) and under a dynamic vacuum at a pressure of 90 millibars (mbar), with temperature being raised to 1600° C. and with that temperature being conserved for 36 h, so as to convert the $SiO_2$ in SiC by reacting with the carbon of the fiber preforms, and so as to transform the SiC into carbon.

Thereafter, the preforms were densified with a carbon matrix obtained by CVI, and the densified annular preforms were machined to obtain disks of the desired dimensions made of C/C composite material and representative, on a reduced scale, of aviation brake disks.

Example 2

Comparative

Carbon fiber preforms obtained as in Example 1, but not impregnated, were densified with a carbon matrix by CVI, as in Example 1, in order to obtain disks having the same dimensions as in Example 1.

Example 3

Comparative

The procedure was the same as in Example 1, but the heat treatment was performed under a nitrogen atmosphere at 1600° C. for only 4 h, that duration being sufficient to enable carbide to be formed, but not sufficient to transform all of the carbide into carbon.

Tests

The following disks were subjected to braking tests:
$D_{11}$, $D_{12}$ obtained in accordance with Example 1;
$D_{21}$, $D_{22}$ obtained in accordance with Example 2; and
$D_{31}$, $D_{32}$ obtained in accordance with Example 3.

Figure 3:
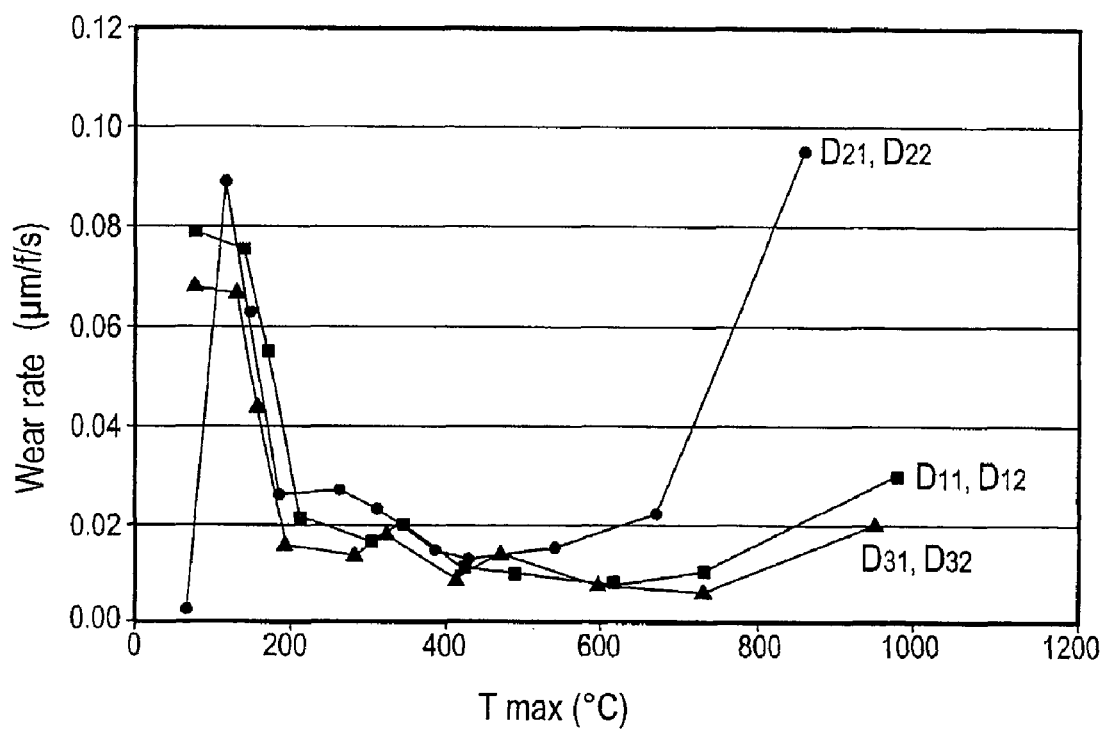
FIG. 3 plots curves showing the wear measured on brake disks made of C/C composite material as a function of temperature, for brake disks obtained in accordance with the invention and for brake disks of the prior art.

FIG. 3 plots the observed variation in wear as a function of the temperature reached by the disks (measured 1 millimeter (mm) below the rubbing surface), with wear being measured in micrometers per friction face per second (μm/f/s).

It can be seen that the disks $D_{11}$, $D_{12}$ obtained in accordance with the invention at high temperatures provided very good wear resistance in comparison with that of the disks $D_{21}$, $D_{22}$ obtained without introducing particles of $SiO_2$.

Mechanical tests were performed on test pieces E1, E3 of the same composite material as used for the disks obtained in Examples 1 and 3.

Table 1 below gives the measured values of compression strength and of compression modulus in the Z direction (perpendicularly to the faces of a disk), of the trans-laminar shear strength (parallel to the plies of the fiber preform of the disk), and of impact strength.

The tests were performed in compliance with European standards EN658-2 (Advanced technical ceramics—mechanical properties of composite ceramics at room temperature—Part 2: determining compression properties) and EN10045-1 (Charpy-impact tests on metallic materials—Part 1: test method).

Figure 4:
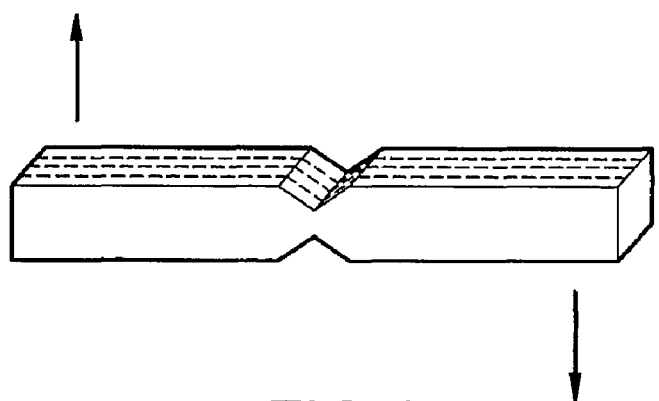
FIG. 4 is a highly diagrammatic view of a test piece made of C/C composite material for trans-laminar shear strength testing.

To measure the trans-laminar shear strength, a test piece was used as shown in FIG. 4 where the arrows represent the applied shear force and the dashed lines symbolize the plies of the fiber texture.

TABLE 1

|  | $E_1$ | $E_3$ |
|---|---|---|
| z compression strength (MPa) | 125 | 71 |
| z compression modulus (GPa) | 4.1 | 2.5 |
| Trans-laminar shear strength (MPa) | 51.7 | 29.5 |
| Impact strength (kJ/m$^2$) | 11.1 | 4 |

The disk obtained by the method of the invention presents mechanical properties that are better than those of disks of Example 3 and comparable to those of conventional state of the art disks.

Thus, in remarkable manner, an advantage is obtained in terms of resistance to wear that is similar to that provided by having carbide particles present, but without any negative effect on mechanical characteristics.

What is claimed is:

1. A method of fabricating a friction part out of carbon/carbon composite material, the method comprising:
   obtaining a three-dimensional fiber preform of carbon fibers impregnated with a solution or a suspension enabling a dispersion of refractory metal oxide particles to be left on the fibers of the preform;
   applying heat treatment to form a metallic carbide by a carboreduction reaction of the refractory oxide with the carbon of the fibers;
   continuing the heat treatment until the carbide is transformed into carbon by eliminating of the metal; and then
   densifying the preform with a carbon matrix by chemical vapor infiltration.

2. A method according to claim 1, wherein the heat treatment is performed under an inert atmosphere.

3. A method according to claim 1, wherein the heat treatment is performed under an atmosphere made up of an inert gas and oxygen at a concentration lying in the range 2 ppm to 250 ppm.

4. A method according to claim 1, wherein the heat treatment is performed at a temperature lying in the range 1450° C. to 2300° C.

5. A method according to claim 1, wherein the heat treatment is performed for a total duration of not less than 2 h.

6. A method according to claim 1, wherein the preform is impregnated by a colloidal suspension of oxide particles.

7. A method according to claim 1, wherein the preform is impregnated by a sol-gel containing at least one oxide precursor.

8. A method according to claim 1, wherein the oxide introduced into the fiber preform by impregnation represents 0.01% to 10% by weight of the weight of the fiber preform prior to impregnation.

9. A method according to claim 1, wherein the following are performed in succession: a step of making the fiber preform; and a step of impregnating the fiber preform with the solution or the suspension.

10. A method according to claim 1, wherein the following are performed in succession: a step of impregnating a two-dimensional fiber texture with the solution or the suspension; and a step of making the impregnated fiber preform from the impregnated fiber texture.

11. A method according to claim 1, wherein the following are performed in succession: a step of impregnating yarns with the solution or the suspension; a step of making an impregnated two-dimensional fiber texture from the impregnated yarns; and a step of making the impregnated fiber preform from the impregnated fiber texture.

12. A method according to claim 1, wherein a carbon precursor is added to the solution or the suspension.

13. A method according to claim 12, wherein the carbon precursor is a polysaccharide.

14. A method according to claim 1, wherein the refractory oxide is $SiO_2$.

* * * * *